United States Patent [19]

Fattal et al.

[11] Patent Number: 4,536,685
[45] Date of Patent: Aug. 20, 1985

[54] CONTROL FOR GIMBALLED MONOPULSE ANTENNA ARRANGEMENT

[75] Inventors: Jean A. Fattal; Michael L. Roesler, both of Lexington, Mass.

[73] Assignee: Raytheon Company, Lexington, Mass.

[21] Appl. No.: 356,699

[22] Filed: Mar. 3, 1982

[51] Int. Cl.³ .................. H02K 23/00; H02P 1/18; H02P 3/08; H02P 5/06
[52] U.S. Cl. .................................. 318/254; 318/608; 343/761
[58] Field of Search ............... 343/761; 318/138, 254, 318/616, 608; 324/205

[56] References Cited

U.S. PATENT DOCUMENTS

| | | | |
|---|---|---|---|
| 4,070,678 | 1/1978 | Smedes | 343/754 |
| 4,188,570 | 2/1980 | Masters et al. | 318/616 |
| 4,197,655 | 4/1980 | Moore | 74/5.47 |

Primary Examiner—Theodore M. Blum
Attorney, Agent, or Firm—Philip J. McFarland; Joseph D. Pannone

[57] ABSTRACT

An arrangement for determining the rotational position of the rotor of an electrical gyroscope is shown to include:

(a) at least one sensor including a Hall effect crystal having a rotating magnetic field applied thereto, such field being synchronous with the field causing rotation of the rotor;

(b) a phase-lock loop, responsive to square wave signals corresponding to signals out of the Hall effect crystal and a voltage-controlled oscillator to provide a signal approximating the rotational position of the rotor; and (c) a phase detector, responsive to negative going transitions of the square wave and to reference pulses to synchronize the rotational position of the rotor with the reference pulses.

1 Claim, 2 Drawing Figures

CONTROL FOR GIMBALLED MONOPULSE ANTENNA ARRANGEMENT

The Government has rights in this invention pursuant to Contract No. DAAK 10-80-C-0066 awarded by the Department of the Army.

BACKGROUND OF THE INVENTION

This invention pertains generally to arrangements for controlling the orientation of movable elements within a body, and particularly to an arrangement for precisely controlling a gimbal for a gyroscopically stabilized antenna.

The continuing development of components for radar has recently made it feasible to design and produce systems which operate in the so-called "millimeter region," i.e., systems having an operating frequency band encompassing 94 GHz. However, along with the advantages such as the relatively small size and weight of such types of radar, new and hiterto unrecognized problems have arisen. For example, when the antenna for a radar is mounted on a gyroscopically stabilized platform (as in a target seeker in a projectile or missile), known types of control circuitry are inadequate. That is to say, because the width of the radar beam of a radar operating at 94 GHz may be extremely narrow, known ways to control the orientation of a gyroscopically stabilized platform so that such a beam may track a target are not sufficiently accurate for satisfactory operation. In addition, when it is desired to use a digital computer to process signals out of a radar having a gyroscopically stabilized antenna, it is necessary that the instantaneous rotational position of the rotor of the gyroscope motor must be monitored. That is to say, that rotor must be phase-locked to the master clock signal of the digital computer.

SUMMARY OF THE INVENTION

With this background of the invention in mind, it is therefore a primary object of this invention to provide a phase-lock loop control circuit for precisely determining, at any instant of time, the orientation of a gyroscopically stabilized platform.

The foregoing and other objects of this invention are generally attained by providing, in connection with a gyroscopically stabilized platform for a radar antenna, a pair of phase-locked control loops that operate in tandem to gimbal such platform. The first loop of the pair has a relatively broad response that provides approximate synchronization of an electric motor driving the gyroscope associated with the gyroscopically stabilized platform with an externally generated clock signal; the second loop then establishes an exact synchronization.

BRIEF DESCRIPTION OF THE DRAWINGS

For a more complete understanding of this invention, reference is now made to the following description of the accompanying drawings, wherein.

DESCRIPTION OF THE PREFERRED EMBODIMENT

Figure 1:
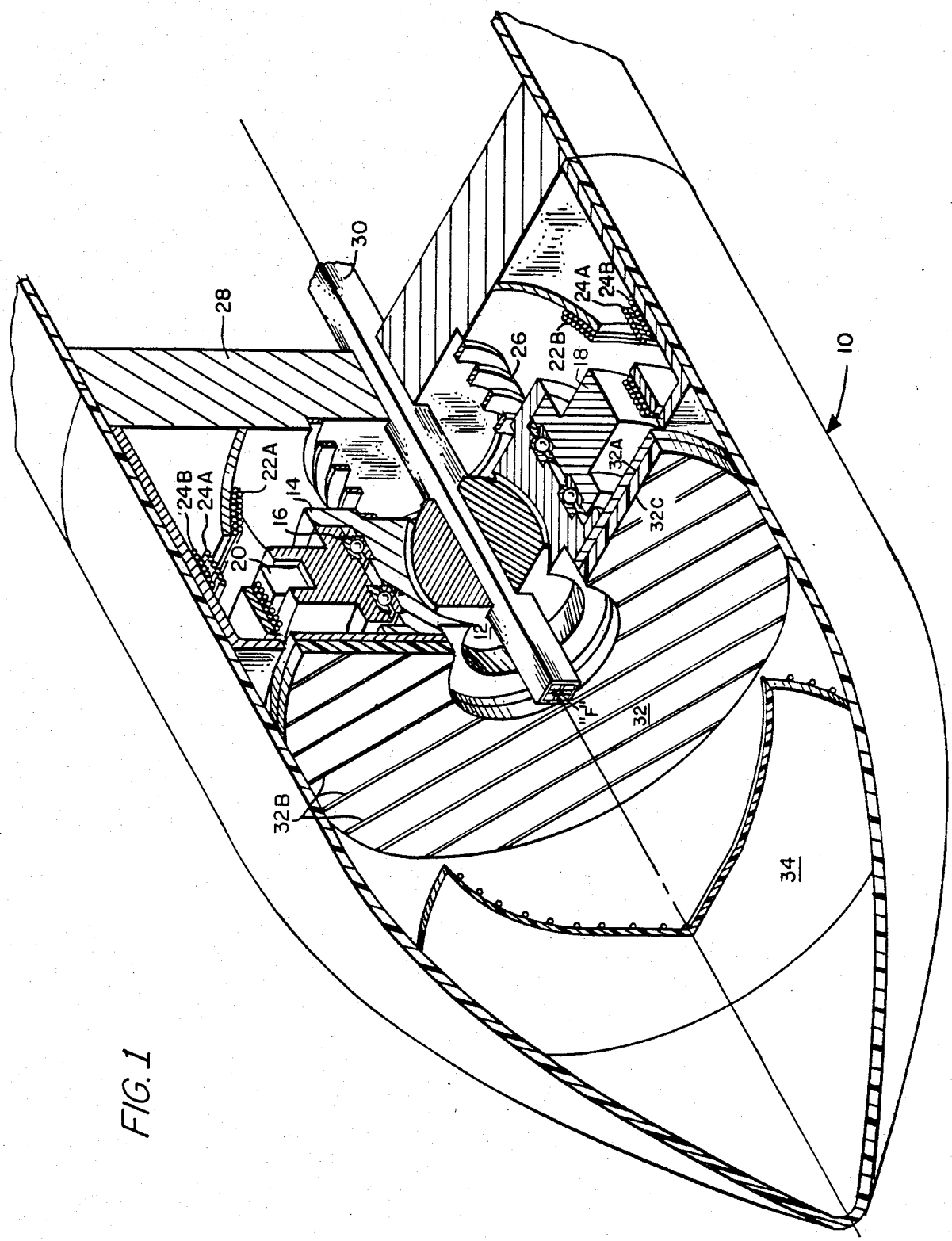
FIG. 1 is a cross-sectional view of a gyroscopically stabilized platform in a radar according to this invention.

Referring now to FIG. 1, a gyroscopically controlled platform (not numbered) is shown to include a gimbal (not numbered) made up of three abutting sections whereby the boresight angle of an antenna assembly (not numbered) may be gyroscopically stabilized and such antenna may be oriented (with respect to the longitudinal axis of a projectile 10) without spinning. The innermost section 12 of the gimbal (not numbered) is a spherical bearing, supported in any convenient manner so as to be centered at a point on the longitudinal axis of the projectile 10. The central section 14 of the gimbal is a first annular member mounted as shown on the spherical bearing and shaped to receive the inner race (not numbered) of a ball bearing 16. The outermost section 18 of the gimbal is a second annular member shaped as shown to receive the outer race of the ball bearing 16 and to support a pair of permanent magnets such as that designated 20. Precession coils and stator coils such as those designated 22A, 24A, 22B, 24B are affixed, in any convenient manner, about the periphery of the gimbal, as shown. Leads (not shown) from each of the coils provide: (a) the requisite rotating magnetic field to cause the outermost section 18 to rotate so as to become a gyroscopic mass; and (b) a magnetic field interacting with the permanent magnet 20 to orient the outermost section 18 with respect to the longitudinal axis of the projectile 10. The central section 14 then is similarly oriented about the spherical bearing 12. However, the rotational movement of the outermost section 18 is almost completely decoupled from the central section 14 by reason of operation of the ball bearing 16.

The drag on the central section 14 due to friction in the ball bearing 16 (which obviously would cause some rotation of the central section 14) is overcome by restraining means, here a helical spring 26, disposed as shown between a bulkhead 28 and the central section 14. The ends of the helical spring 26 are attached in any convenient manner to the bulkhead 28 and the central section 14. It will now be apparent that, although the helical spring 26 appears to be a rigid body preventing any rotational movement of the central section 14 induced by drag in the ball bearing 16, the coils (not numbered) of such spring will yield when the central section 14 is subjected to a force in any plane orthogonal to the plane of rotation of the outermost section 18. To put it another way, the helical spring 26 allows gimballing of the central section 14 (and the outermost section 18) about the spherical bearing 12 and completes decoupling of the rotational movement of the outermost section 18 from the central section 14.

The antenna assembly here is substantially similar to the arrangement shown in U.S. Pat. No. 4,070,678, issued Jan. 24, 1978 and assigned to the same assignee as the present invention, without the spherical electromagnet lens incorporated in that arrangement. Thus, a waveguide 30 (here divided by septa (not numbered) to form a monopulse feed with the "H" plane horizontal in each division) is mounted in any convenient manner so that the center of one end is located at a point marked "F" on the longitudinal axis of the projectile 10. The second end of the waveguide 30 is led to a radar transmitter/receiver (not shown). A planar polarization-twisting reflector 32 is mounted in any convenient manner on the central section 14. A polarized paraboloid 34 is affixed to the projectile 10 in any convenient manner so that the focal point of such paraboloid is coincident with the point F.

As described in detail in the patent cited above, the planar polarization twisting reflector 32 is a conventional "quarter-wave plate" made up of a metallic base member 32A and a plurality of parallel wires 32B oriented at an angle of 45° to the "H" plane and spaced (by means of a dielectric spacer 32C) from the metallic base member 32A by one-quarter wavelength of the radio frequency energy at the operating frequency. The polarized paraboloid 34 is made up of an appropriately shaped dielectric base (not numbered) supporting a plurality of parallel wires (not numbered) oriented parallel to the "H" plane. Preferably such wires are printed on such base in any convenient manner.

Again, for reasons described in the cited patent, the waveguide 30 and the pluralities of wires in the polarization-twisting reflector 32 and the polarized paraboloid 34 are oriented with respect to each other in such a manner that: (a) for radio frequency energy emanating from the waveguide 30 during transmission or for radio frequency energy reflected from the polarization-twisting reflector 32 during reception, the polarized paraboloid 34 is, for all practical purposes, opaque; and (b), for radio frequency energy reflected from the polarization-twisting reflector 32 reflected during transmission, or for radio frequency energy reflected from any target (not shown) outside the projectile 10, the polarized paraboloid 34 is, for all practical purposes, transparent. It follows, then, that gimballing of the central section 14 causes the attached polarization-twisting reflector 32 to be similarly oriented. The result then is that the centerline of the radar beam (not shown) may be oriented with respect to the longitudinal centerline (not shown) of the projectile 10. To put it another way, the boresight line of the described antenna assembly may be changed with respect to the longitudinal axis of the projectile 10, such boresight line being gyroscopically stabilized without detracting from proper monopulse operation by rotation of the polarization-twisting reflector 32. In passing, it will be noted that the thickness of the dielectric spacer 32C preferably is determined so that the path length of radio frequency energy passing through such spacer is at the nominal quarter-wavelength when the boresight angle (the angle between the longitudinal axis of the projectile 10 and the centerline of the radar beam) is equal to one-half the maximum desired scan angle.

Figure 2:
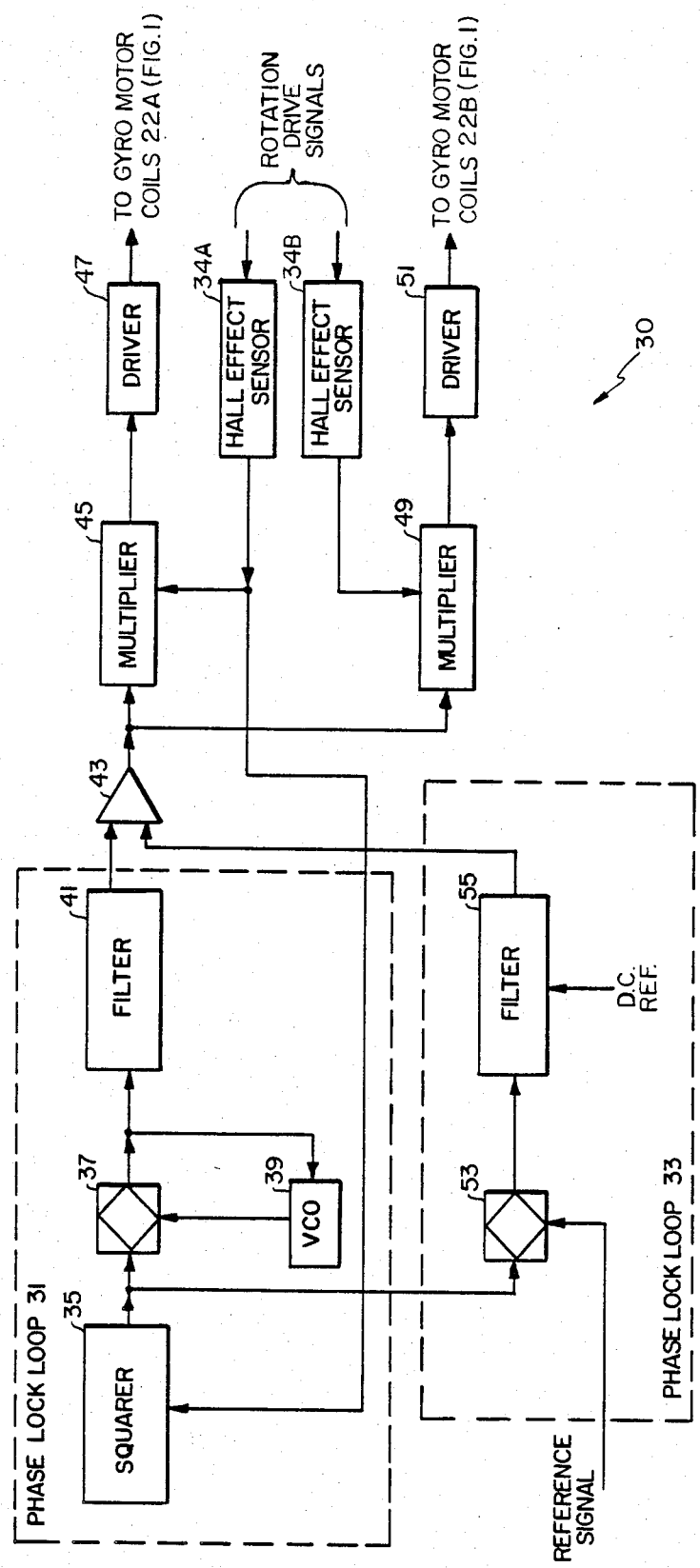
FIG. 2 is a simplified block diagram of control circuitry for the gyroscopically stabilized platform shown in FIG. 1.

Before referring to FIG. 2 in detail, it should be noted that two orthogonally disposed Hall effect crystals are here contemplated to serve as sensors to produce sine and cosinusoidal signals. For example, the apparatus shown and described in U.S. Pat. No. 3,824,455 issued July 16, 1974 and assigned to the same assignee as the present invention, may be adapted to the purpose here. Therefore, the details of construction of the sensors will not be here described.

Referring now to FIG. 2, a gyro motor drive circuit adapted to the desired purpose here is shown to include a pair of phase-lock loops 31, 33 (hereinafter referred to sometimes as PLL 31 or PLL 33). One input signal to phase-lock loop 31 is a monitoring signal (which here corresponds to the output from one of a pair of Hall effect sensors 34A, 34B) that is applied to a squaring network or squarer 35. It should be appreciated that the crystals (not shown) in each one of the Hall effect sensors 34A, 34B are immersed in a rotating magnetic field synchronized with the magnetic field, causing rotation of the outermost section 18 (FIG. 1) in such a way that the outputs of the Hall effect sensors 34A, 34B are additive. It should also be appreciated that the output signal from only one of the Hall effect sensors (here Hall effect sensor 34A) is required to phase-lock the spin rate of the outermost section 18 (FIG. 1) to a reference signal, here a submultiple of the system clock signal. The squaring network 35 is effective to convert the sinusoidal output signal from the Hall effect sensor 34A to a square wave signal for further processing within PLL 31. The output signal from the squaring network 35 is split, a first portion of such signal being applied to a phase detector 37 (here a type CD 4046 manufactured by RCA Solid State Division Somerville, New Jersey, and a second portion of such signal being passed to the phase-lock loop 33. The reference signal for the phase detector 37 is obtained from a voltage-controlled oscillator (VCO 39) that, in turn, is controlled by a part of an error signal from the phase detector 37 in a conventional manner. The remaining part of the error signal from the phase detector 37 is also passed to a filter network 41 (here a low pass filter network) wherein the error signal is smoothed. The output signal from the filter network 41 (which will be appreciated is large initially and gradually decreases to a minimum as the phase-lock condition is achieved) is passed, via a summing amplifier 43, to a multiplier 45 wherein multiplication by the output signal from the Hall effect sensor 34A is effected to produce properly phased (in relation to the spinning rotor) signals for driving, via a driver 47, the gyro rotor (not shown).

The summing amplifier 43 also provides an input to a multiplier 49 wherein it is multiplied by the output signal from Hall effect sensor 34B to produce properly phased signals, via a driver 51, for the gyro rotor (not shown).

As mentioned briefly hereinabove, the squaring network 35 also provides an input signal to PLL 33. Within the latter, this signal is applied to a phase detector 53, (here a type MC4344 manufactured by Motorola Semiconductor Products, Inc.) the reference signal to which is derived by division of the system clock (not shown). The phase detector 53 compares the negative going edges of the reference signal to the squared output from the Hall effect sensor to generate error signals. These error signals are passed to a filter network 55 wherein they are filtered and differentially compared to the D.C. reference signal to center the error signal about zero volts D.C. The phase-sensitive error signal from the filter network 55 is also applied to the summing amplifier 43 wherein it is combined with the error signal from PLL 31 to further adjust that signal as needed to ensure precise edge synchronization between the reference signal (not shown) and the Hall effect sensor and thereby between the system clock (not shown) and the spinning outer gimbal section 18 (FIG. 1).

It will now be appreciated that once synchronization between the reference signal and the spinning outer gimbal section 18 (FIG. 1) is attained, the gimballing of the antenna system (not shown) may be more accurately controlled.

Having described a preferred embodiment of the invention, it will now be apparent to one of skill in the art that many modifications may be made without departing from the disclosed concept. It is felt, therefore, that this invention should not be restricted to its disclosed embodiment, but rather should be limited only by the scope of the appended claims.

What is claimed is:

1. In a gyroscopically stabilized arrangement wherein a rotor of an electric motor serves as a gyroscopic mass when such rotor is rotated to follow a rotating magnetic field corresponding to a similarly rotating electric field in a stator of such motor, control apparatus for determining the rotational position of such rotor, such apparatus comprising:

(a) at least one Hall effect sensor including a pair of orthogonally disposed Hall effect crystals immersed in a rotating magnetic field corresponding to the rotating electric field of the stator;

(b) first phase detector means, responsive to the output signal of the Hall effect sensor and to the output signal of a voltage-controlled oscillator, to produce a first bipolar D.C. signal representative of the difference in frequency between such output signals;

(c) second phase detector means, responsive to the output signal of the Hall effect sensor and to a reference signal having a fixed frequency, to produce a second bipolar D.C. signal representative of the difference in frequency between such output and reference signals;

(d) means for summing the first and second bipolar D.C. signals to produce a correction signal; and (e) means, responsive to the correction signal, to change the frequency of the rotating electric field of the stator to null the correction signal, ultimately to synchronize the rotating magnetic field with the reference signal.

* * * * *